June 1, 1937.  A. C. FREUDENBERG  2,082,053
COTTON PICKER
Original Filed March 4, 1932  4 Sheets-Sheet 1
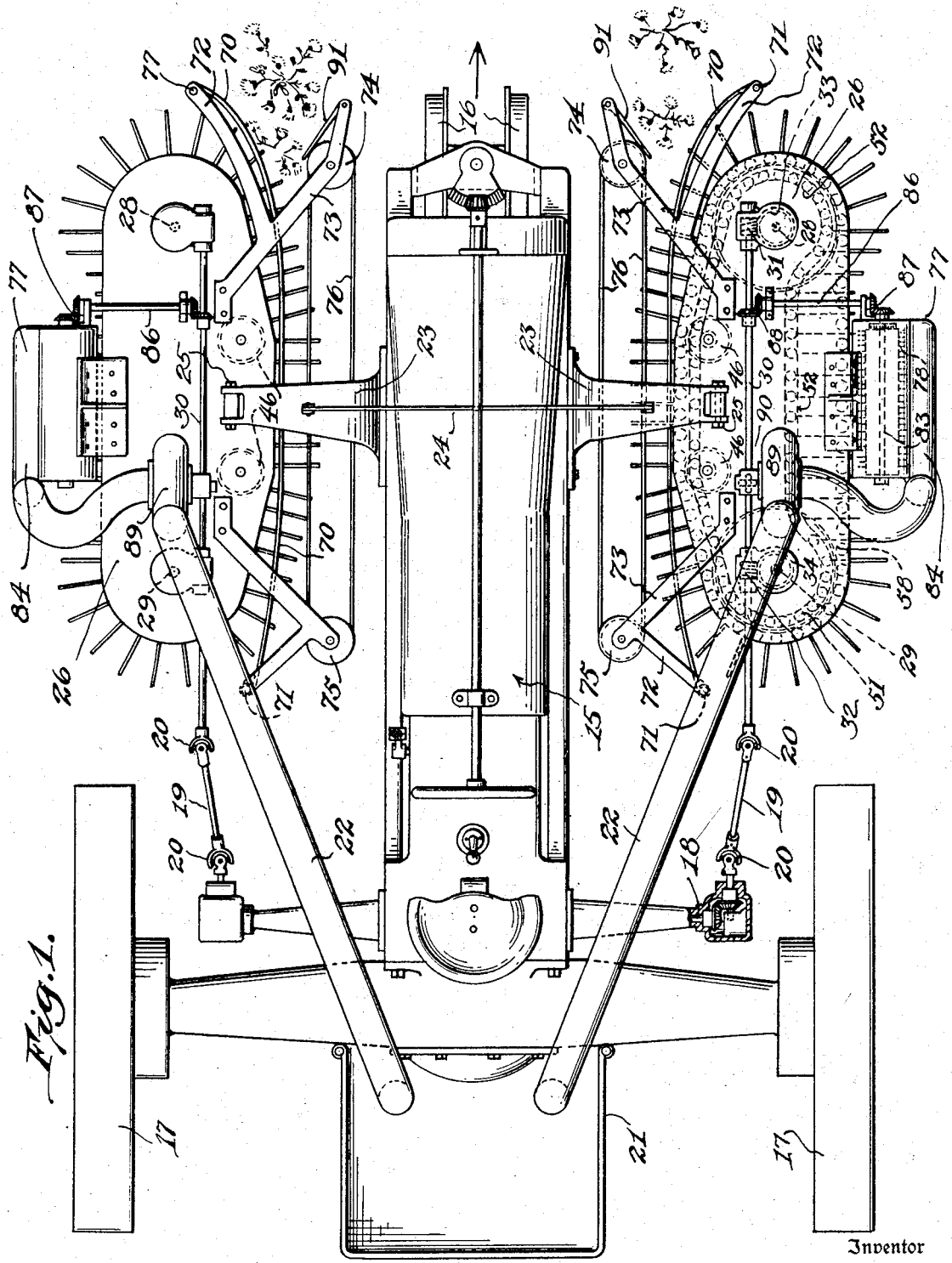
Inventor
Albert C. Freudenberg,
By Myron G. Clear
Attorney

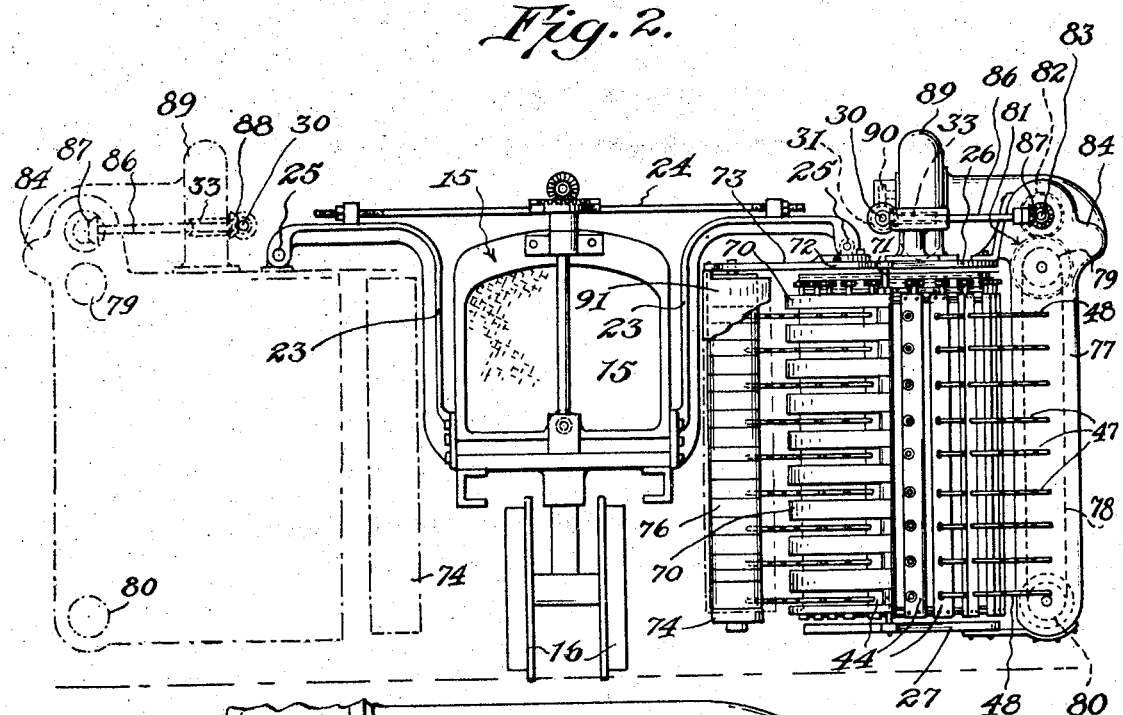
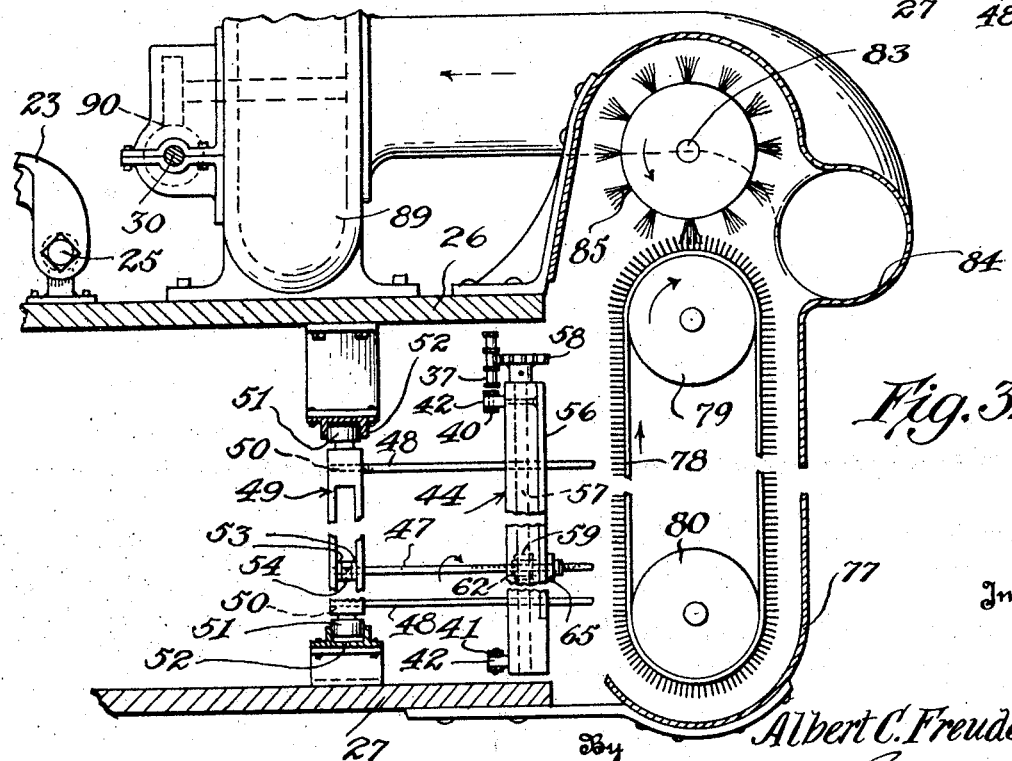

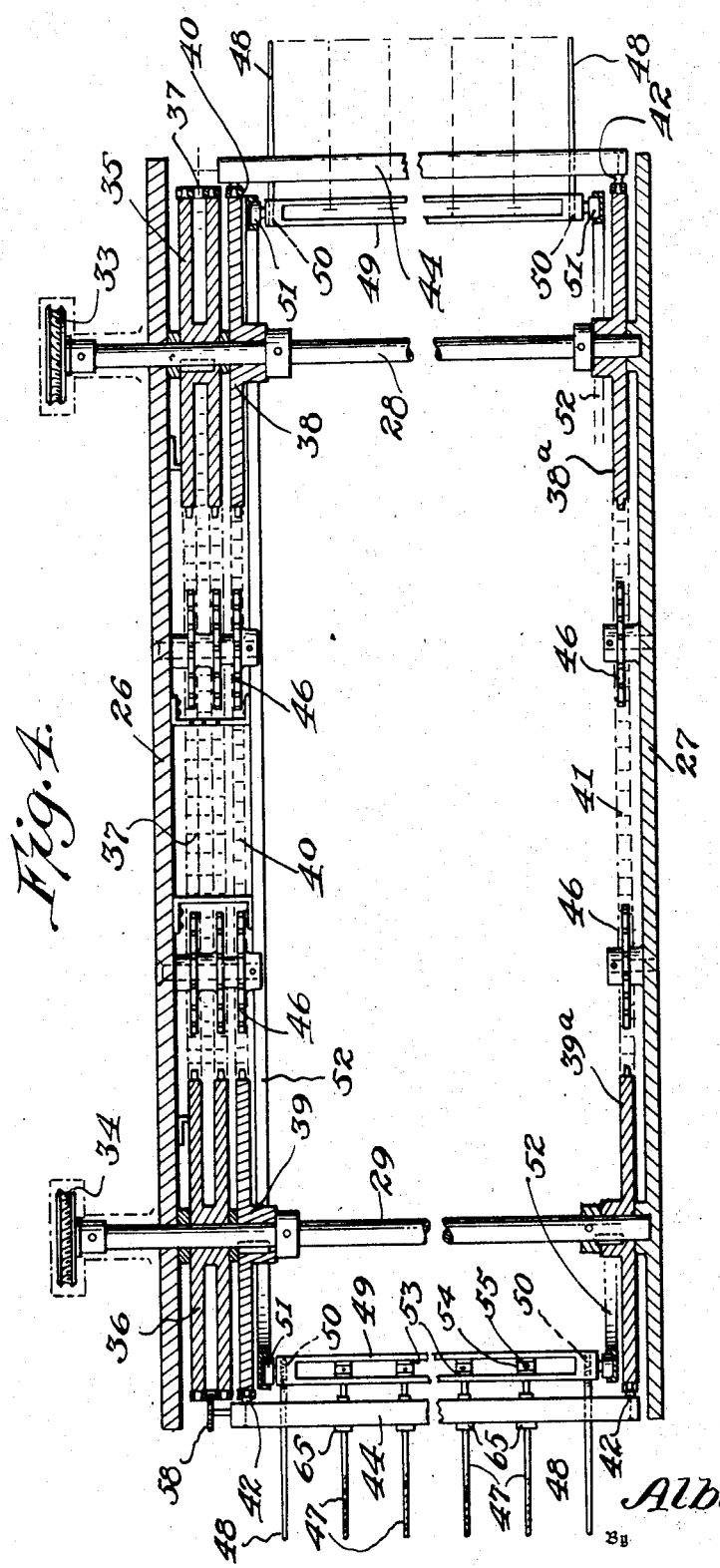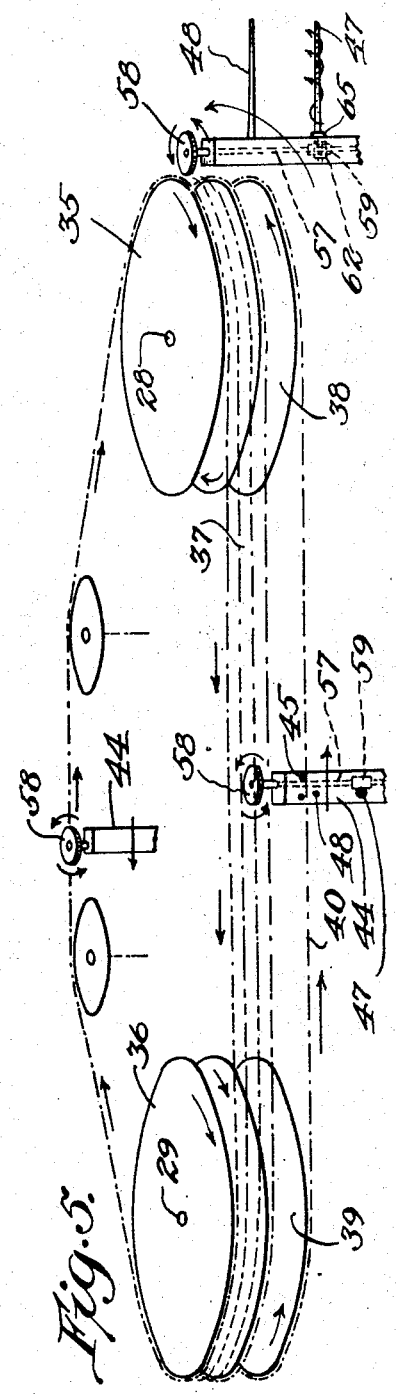

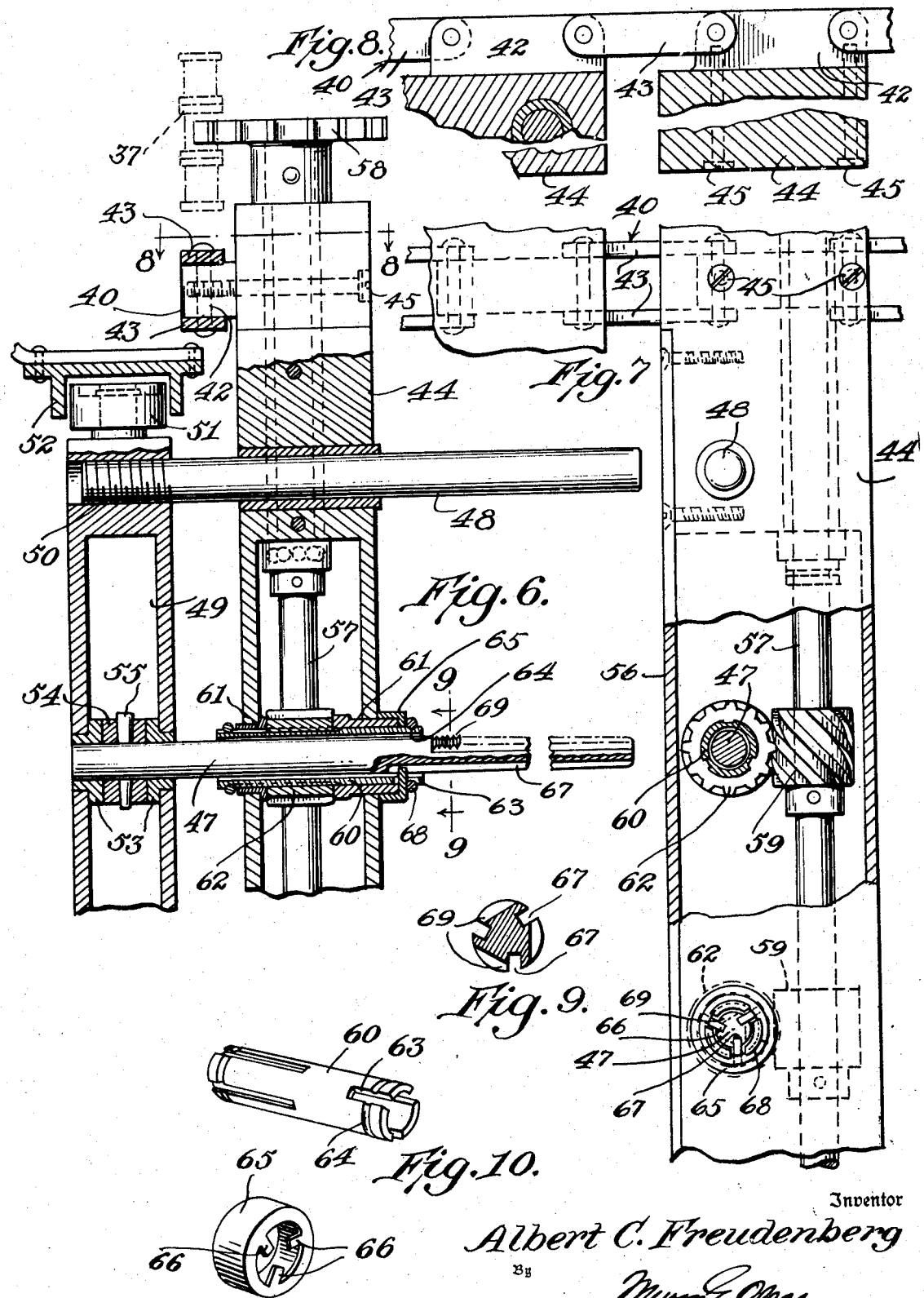

Patented June 1, 1937

2,082,053

UNITED STATES PATENT OFFICE 2,082,053

COTTON PICKER

Albert C. Freudenberg, Greenville, Miss., assignor to Charles R. Berry and Hugh A. Gamble, both of Greenville, Miss.

Application March 4, 1932, Serial No. 596,849
Renewed July 30, 1936

19 Claims. (Cl. 56—14)

My present invention relates generally to cotton pickers, and more particularly to cotton pickers of what is best known as the spindle type where rapidly rotating spindles are caused to pass into the plants so that such cotton as is encountered is wrapped around the spindles and pulled from the bolls.

The most common form of spindle machine is that in which the spindles radiate from the surfaces of a pair of parallel spaced apart vertical cylinders between which the plants pass. These cylinders are revolved at about the speed of forward movement of the machine so as not to mutilate the plants, and it is plain that the spindles are effective to pick cotton as they swing around the inner or adjacent sides of the cylinders. The cotton so picked is removed from the spindles as they swing around the outer sides of the cylinders.

The above type of cotton picker has demonstrated its effectiveness and efficiency in actual use in the field, but the many connections to the cylinders hardly permit of their duplication in a single machine and thus limit the machine to a single row harvester.

The primary object of my present invention is to provide a two-row cotton harvester of the spindle type, and a further object is to provide a machine, for instance, a tractor, with two picking units, each of the spindle type though avoiding the use of cylinders and still maintain efficiency at a high point, both in respect to quantity and quality of the picked cotton.

A still further object is to provide a machine having separate picking units so arranged, mounted and connected as to permit of the ready easy repair or substitution of each unit should it be required.

A still further object is the provision of a picking unit or mechanism, which automatically adjusts itself when the machine passes over uneven ground and which assures the final recovery of a very high percentage of cotton bolls in a clean most highly prized state.

A still further object is the provision of a two unit picking mechanism, which readily lends itself to use in connection with commercial tractors from which the units may be readily removed.

With the above and many other objects in mind, my invention proposes a cotton picker having the construction and advantages which will be made plain in the course of the following description and by reference to the accompanying drawings, forming a part of this specification, and in which, Figure 1 is a top plan view of a machine embodying my invention in its preferred form;

Figure 2 is a front elevation thereof;

Figure 3 is a detail vertical section on an enlarged scale partially through one of the units;

Figure 4 is a similar view taken lengthwise through one of the units;

Figure 5 is a diagram showing the directional movement of the various chains and their controlling and driving connections;

Figure 6 is an enlarged vertical section partially through one of the spindle actuating bars and the adjacent portion of the corresponding spindle carrying bar;

Figure 7 is a side view, partially broken away and in section of the spindle actuating bar of Figure 6;

Figure 8 is a detail horizontal section taken on line 8—8 of Figure 6;

Figure 9 is a detail section taken through one of the spindles on line 9—9 of Figure 6;

Figure 10 is a detail perspective view of one of the spindle bearing sleeves; and, Figure 11 is a similar view of one of the spindle connecting collars.

Referring now to these figures, and particularly to Figures 1 and 2, my invention proposes the suspension of two picking units, one at each side of a tractor, so connected that they will assume vertical positions at all times and may be connected and disconnected readily and easily for purposes of repair and substitution. In the figures mentioned, the tractor is shown generally at 15 and may be a well-known farm tractor intended for double-row cultivation, with small closely related front steering wheels 16, large widely spaced rear wheels 17 and laterally extending housed driven shafts 18 adjacent to the rear thereof for the driving of the two picker units through shafts 19 having flexible couplings 20.

I preferably mount at the extreme rear of the tractor a readily removable basket 21 for the reception of the picked cotton through flexible conduits 22, whose rear discharge ends are turned downwardly into the basket, and for the support of the picking units I rigidly mount at the forward side portions of the frame of the tractor a pair of upwardly extending brackets 23. These brackets have upper outstanding portions, preferably with upstanding lugs providing for their rigid connection and support by a tie bar 24 extending above and across the tractor.

As best seen in Figure 2, the outstanding arms of the supporting brackets 23 are downturned and shaped to provide for the connection of the picking units in suspended relation by pivot bolts 25, and while it is to be understood the various connections previously described may necessarily be varied according to the particular construction of the tractor which is employed, the foregoing functions and results in any case should permit the picking units to assume vertical positions at all times.

The picker units are of similar construction, except as to rights and lefts, and each has a top plate 26 and a bottom plate 27 rigidly connected in the desired spaced relation in practice by suitable stay bolts, and each supporting vertical rotatable forward and rear shafts 28 and 29. The top plate 26 also has upper bearings for a longitudinal shaft 30 connected at its rear end to the forward flexible coupling 20 of the connecting shaft 19 and this shaft has, opposite the vertical shafts 28 and 29, worms 31 and 32, respectively, for driving the said vertical shafts in relatively opposite directions through worm wheels 33 and 34.

Immediately below the top plate 26, the shafts 28 and 29 have thereon double sprockets 35 and 36, the toothed discs of each sprocket being vertically spaced. The sprocket 35 is keyed to shaft 28, while the sprocket 36 is loose on shaft 29, and these sprockets will thus be rotated, and their connecting three run sprocket chain 37 moved, according to the direction of rotation of shaft 28 which is clockwise. The upper and lower runs of the chain 37 engage the sprocket teeth of sprockets 35 and 36 whose spacing leaves the center run of the chain free for the reception of and cooperation with the spindle rotating connection to be hereinafter described.

At points below the double sprockets 35 and 36, the shafts 28 and 29 support single sprockets 38 and 39 and similar sprockets 38ᵃ and 39ᵃ are supported on these shafts at their lower end immediately above the bottom plate 27. The sprockets 38 and 38ᵃ are loose on the forward shaft 28, while the sprockets 39 and 39ᵃ are keyed to the shaft 29 so that these several single sprockets and the upper and lower chains 40 and 41 travelling in engagement therewith will be moved in the direction of rotation of the rear shaft 29, which is counter-clockwise.

The carrier chains 40 and 41, just above referred to, are made up of link connected blocks, as best seen in Figure 8, where the blocks 42 are shown connected in spaced relation by links 43 so that the blocks 42 will seat between the teeth of the sprockets driving the carrier chains.

To the blocks 42 of the upper and lower carrier chains, the upper and lower ends of upright carrier bars 44 are rigidly connected by set screws or bolts 45 so that the bars 44 travel with the carrier chains 40 and 41 around the sprockets 38, 38ᵃ, 39 and 39ᵃ, moving regularly from the front to the rear of the picker unit at its inner side where, by means of idle guide sprockets 46, the carrier chains and bars are shifted outwardly beyond a normal line between the driving sprockets, as will be seen in Figure 1.

Each carrier bar 44 has a vertical series of horizontal transverse openings to slidably receive therethrough its respective vertical series of picking spindles 47 and upper and lower dummy spindle 48. Each such series of spindles is supported by a bar 49 inwardly beyond the respective carrier bar 44, as particularly plain in Figure 6. The inner ends of the dummy spindles 48 are preferably tightly screwed into the upper and lower ends of the supporting bar 49, as at 50, so that with their snug sliding connection with the respective carrier bar 44, the two dummy spindles of each vertical series effectively prevent lateral strain on the intermediate picking spindles 47 of the series.

Each spindle supporting bar 49 has at its upper and lower ends horizontally disposed rollers 51 which travel in guide tracks 52 attached to the top and bottom plates 26 and 27 and the hollow body of each bar is open along one side to permit of the ready connection and disconnection of the inner ends of the picking spindles 47 so that they may with respect to the supporting bar and at the same time be confined against longitudinal movement with respect thereto. To this end, as plainly seen in Figure 6, each picking spindle is extended at its inner end through spaced apart bearing rings 53 rotatable in the opposite walls of the bar, and through a collar 54 between the bearing rings 53 to which the spindle is secured by a transverse taper pin 55.

Through each carrier bar 44, which has a removable side plate 56, is a vertical rotatable shaft 57 having at its upper end, above the bar, a sprocket wheel 58 in engagement with the center run of the three run chain 37, previously described, and each shaft 57 has at spaced points therealong within the bar a securely fastened worm 59. Each picking spindle 47 slides through a sleeve 60 journalled through bearings 61 in the carrier bar 44, upon which sleeve a worm wheel 62 is splined, this worm wheel being in engagement with one of the worms 59 of the shaft 57, as seen by a comparison of Figures 6 and 7.

At the outer side of the carrier bar 44, each sleeve 60 has a lengthwise slotted end 63 having an annular external groove 64 (see Figure 10) protruding from the bar to receive a flanged cap 65 (see Figures 6 and 11) having inwardly projecting fingers 66 to extend through the slots 63 of the sleeve and into lengthwise grooves 67 of the spindle 47. A split spring ring 68 seated in the groove 64 of the sleeve, holds the cap 65 in place to couple the spindle rotatably with the driven bearing sleeve and at the same time permit the spindle to freely slide through the sleeve and with respect to the carrier bar, for a purpose which will presently appear.

The picking spindles 47 are well adapted to the above described clutching means, since the grooves 67 are necessarily a feature thereof to permit of the formation of teeth 69 by milling the surface of the cylindrical tapering bodies of the spindles along lines inclined with respect to the longitudinal axes thereof. The milling cuts extend through one wall of each of the grooves 67 which wall is along a true radial line with respect to the axis of the spindle. Thus, the center line of each groove 67 is offset with respect to the axis of the spindle giving the toothed wall of each groove a substantial radial projection beyond the opposite wall thereof without projection of any part beyond the true circumferential surface of the spindle. This structure permits of more readily engaging the cotton tufts without making it any more difficult to remove the cotton from the spindle.

Obviously, since the spindles are moving with the carrier bars in one direction (counter-clockwise) and the spindle rotating chain 37 is moving in the opposite direction (clockwise), the sum of the speed of these oppositely moving parts is the speed of rotation of the spindle rotating shafts 57, thus imparting the necessary speedy rotation to the spindles without complicated gearing for this purpose.

As the spindles, moving with the carrier bars 44 and carrier chains 40, shift around the forward end of the picking unit at its inner side, toward the tractor, they enter the picking channel which, in practice, receives the cotton plants, and pass along an inclined path from the forward sprockets 38 and 38ª to the forward guide rollers 46. During this movement, the ends of the spindles are projected between guard strips 70 in curved relation along the inner side of the unit from front to rear thereof. These strips 70, of which there is, of course, a vertical series, are spaced apart so that the horizontal rows of spindles pass between them along the entire inner side of the unit and are secured at their forward and rear ends to uprights 71 carried by the ends of bracket arms 72.

The arms 72 are formed in connection with brackets 73 extending from the top and bottom plates 26 and 27 for the rotatable support of vertical front and rear rollers 74 and 75 spaced laterally from the inner side of the unit. These rollers have vertical series of annular grooves to receive a vertical series of endless belts 76 which form the picking channel between the same and the guard strips 70 and which receive the extremities of the spindles between them as the spindles move rearwardly along the inner or picking side of the unit.

The belts 76 are preferably of some suitable flexible material and, obviously, serve to support the plants as the spindles move into and through the latter during their travel throughout the length of the picking channel formed between the more or less parallel series of belts 76 and guard strips 70. During this operation, the rapidly rotating spindles pick the cotton tufts and any broken leaves or twigs are freed by virtue of the passage of the spindles between the belts 76 and between the guard strips 70 just before the spindles, with the picked cotton thereon, round the rear sprockets 39 and 39ª.

During such movement of the spindles around the rear sprockets or rear end of the unit, there is, obviously, ample time for all leaves and twigs to drop or be shaken free so that the cotton will be in a free clean condition as the spindles approach the stripping and doffing station at the outer side of the unit.

During the picking of the cotton, the spindle supporting bars 49 closely follow the carrier bars 44 by virtue of the arrangement of the guide channels 52 in parallel relation to the travel of the carrier chains 40 around the front, rear and inner picking side of the unit, so that during these portions of the travel of the endless series of spindles they will remain in maximum extension beyond the carrier bars 44, as shown in Figure 6.

At the outer side of the unit, as seen in Figure 1, in dotted lines, however, the guide channels or tracks 52 are deflected inwardly and offset or spaced from the straight travelling carrier chains and bars for a distance equal to the lengths of the spindles. Thus, the supporting bars 49 will be shifted so as to withdraw the spindles lengthwise through the carrier bars until just the extreme ends of the spindles extend outwardly beyond the carrier bars for something less than the full travel of the carrier bars along the outer side of the unit. Obviously, during the shifting of the spindles inwardly through the carrier bars, the tufts of cotton on the spindles will be shifted to the spindle ends, the carrier bars acting as strippers.

At the outer side of the unit, in a casing 77 supported from the top and bottom plates 26 and 27, an endless card belt 78 travels around upper and lower horizontal rollers 79 and 80, the shaft of the former having a large gear 81 in mesh with a smaller gear 82 on a vertically spaced shaft 83 (see Figure 2). Thus, the inner side of the card belt 78 travels in close proximity to the ends of the retracted spindles and the spines or needles take the cotton tufts from the spindles' ends and carry the cotton upwardly to the upper roller 79.

Along its upper outer side the casing 77 has formed in connection therewith a suction mouth 84 adjacent to the top of the card belt 78. The upper shaft 83 has a brush 85 mounted thereon to rotate with a rapid movement against the top of the card belt and brush the tufts from the latter into the suction mouth 84, all as plainly shown in Figure 3. Shaft 83 is rotated by means of an upper cross shaft 86 in connection at its outer end therewith by gears 87 and in connection at its inner end, by gears 88, with the shaft 30, see Figure 1.

The suction mouth 84 is in communication with the suction intake of a fan 89 mounted on the top plate 26 and to the outlet of which the forward end of the respective flexible conduit 22, before referred to, is connected. The fan or blower thus mounted, may be driven by suitable gearing 90 from the shaft 30, as seen in Figure 1.

As the machine shown in Figure 1 moves forwardly in the field, straddling two rows of cotton plants, in the direction of the arrow, the plants are guided into the picking channels of the two suspended picking units by the forward outcurved ends of the guard strips 70 and inclined deflector plates 91 disposed at the forward ends of the belts 76. Passing rearwardly through each picking channel between the guard strips 70 and belts 76, the plants are subjected to the action of the rearwardly moving and rapidly rotating picking spindles which penetrate all parts thereof and detach all cotton tufts encountered thereby.

By utilizing for the above purposes, endless series of spindles passing around spaced sprockets, a much greater number of spindles are constantly in action than would be possible with a cylindrical picker having radiating spindles, and this advantage holds good also when the cotton is stripped from the spindles and doffed by the card belts and brushes at the outer sides of the units.

Obviously, I may quickly and easily repair and substitute parts whenever necessary without withdrawing the machine from the field in view of the adaptability of each unit to be completely removed and another substituted until such repairs or substitutions are effected. These and the various other advantages before referred to particularly recommend the present cotton picker as practical, efficient and economical in the highest degree.

Having thus described my invention, what is claimed is:

1. In a cotton picker, a tractor, picking units detachably in connection with said tractor and individually outstanding therefrom at its opposite sides, supporting means carried by and outstanding from the tractor, hinged connections between said supporting means and said units whereby said units are permitted to swing toward and away from the tractor and at the same time prevented from swaying lengthwise of the tractor, and driving connections between the tractor and each of said picking units.

2. In a cotton picker, a picking unit including an endless series of upright carrier bars, a series of spindles movable with each carrier bar and rotatable with respect thereto, carrier chains for supporting and moving said bars, other chains travelling in the same vertical plane with said carrier chains for rotating said spindles, and spindle rotating connections carried by said bars and including sprocket members in constant engagement with said spindle rotating chains.

3. In a cotton picker, a picking unit including an endless series of upright carrier bars, a series of spindles movable with each bar and rotatable and lengthwise movable with respect thereto, carrier chains for moving and supporting said bars, spindle rotating means including connections supported by said carrier bars, a series of bars to which the spindles are rotatably connected and held against lengthwise movement, and means for guiding said last named bars and shifting the same toward and away from the carrier bars.

4. In a cotton picker, a picking unit including an endless series of upright carrier bars, a series of spindles movable with each bar and rotatable and lengthwise movable with respect thereto, carrier chains for moving and supporting said bars, spindle rotating means including connections supported by said carrier bars, a series of bars to which the spindles are rotatably connected and held against lengthwise movement, said last named bars having rollers at the ends thereof, and tracks receiving said rollers to guide the bars and shift the same toward and away from the carrier bars.

5. In a cotton picker, a picking unit including an endless series of upright carrier bars, a series of spindles movable with each bar and rotatable with respect thereto, carrier chains for supporting and moving said bars, other chains travelling in the same vertical plane with said carrier chains for rotating said spindles, means for supporting and moving said chains in relatively opposite directions, and spindle rotating connections carried by said bars including sprocket members in constant engagement with said last named chains.

6. In a cotton picker, a picking unit including top and bottom plates, a pair of spaced apart upright shafts journalled in said plates, means for simultaneously driving said shafts in relatively opposite directions, sprockets on said shafts and secured in driving relation to one of the shafts, a series of upright carrier bars supported and moved by said chains, series of picking spindles movable with said bars and rotatable with respect thereto, spindle rotating chains, sprockets for said latter chains mounted on said shafts and connected in driving relation to the other shaft, and spindle rotating connections on said carrier bars including sprocket members in constant engagement with said spindle rotating chains.

7. In a cotton picker, a picking unit including an endless series of vertical rows of spindles, means including carrier bars and endless chains for moving said spindles lengthwise of said unit, connections for rotating said spindles during such movement, means forming a flexible movable wall defining a path for the plants between the same and the spindle moving means, and opposing the spindles at the picking side of the unit, and means for removing cotton from the spindles at the opposite side of the unit.

8. In a cotton picker, a picking unit including an endless series of vertical rows of spindles arranged in horizontal lines, means for supporting and moving said spindles, connections for rotating the spindles, and means forming a plant receiving channel lengthwise of one side of said unit including spaced apart members each having vertically spaced elements between which the spindles extend and are movable at the corresponding side of the unit and the elements of one of which members are idly movable with the plants.

9. In a cotton picker, a picking unit including an endless series of vertical rows of spindles arranged in horizontal lines, means for supporting and moving said spindles, connections for rotating the spindles, and a series of vertically spaced flexible belts movably mounted along one side of the unit paralleling movement of the spindles and into spaces between which the ends of the spindle project, said belts defining a path between the same and the spindle supports, for receiving the plants, and being idle for movement with the plants.

10. In a cotton picker, a picking unit including an endless series of upright carrier members, a series of spindles movable with each carrier member and rotatable and lengthwise movable with respect thereto, means for supporting and moving said members, means in connection with said members for rotating said spindles during such movement, spindle supporting members adjacent to said carrier members, movable therewith and to which the spindles are rotatably connected and held against lengthwise movement, and means for shifting said supporting members away from the carrier members during a portion of the travel of the latter whereby to move the spindles lengthwise to retracted position.

11. In a cotton picker, a series of vertical rows of picking spindles, an endless movable support for said spindles including upright carrier bars, each bar supporting a row of spindles and through which the spindles project in lengthwise movable relation, spindle rotating connections carried by each bar including members having splined connection with the spindles, and supporting bars paralleling the carrier bars and movable therewith and toward and away therefrom, the spindles being rotatably in connection with said supporting bars and held against lengthwise movement with respect thereto.

12. In a cotton picker, a series of lengthwise grooved picking spindles, an endless series of carriers with which said spindles are movable and with respect to which the spindles are lengthwise shiftable, means for shifting the spindles, and means for rotating the spindles in the carriers, said last named means engaging in the grooves of the spindles.

13. In a cotton picker, a series of bodily movable and axially rotatable spindles having lengthwise grooves, means engaging in the grooves of the spindles for rotating the same, and means for shifting the spindles lengthwise during rotation.

14. In a cotton picker, a series of spindles, each having longitudinal grooves, and means for rotating the spindles including means engaging in the grooves thereof.

15. In a cotton picker, a tractor, picking units detachably in connection with said tractor and individually outstanding therefrom at its opposite sides, supporting means carried by and outstanding from the tractor, and hinged connections between said supporting means and said units, said connections permitting the units to swing toward and away from the tractor and at the same time preventing the units from swaying lengthwise of the tractor.

16. In a cotton picker, a tractor, upwardly and laterally outstanding supporting brackets at opposite sides of said tractor, and picking units hingedly suspended in detachable relation from said brackets, the hinges permitting the units to swing toward and away from said tractor and at the same time preventing swaying of the units lengthwise of the tractor.

17. In a cotton picker, a tractor having side supports and laterally outstanding driven shafts, picking units detachably pivoted in pendulous connection with said supports to swing with respect thereto and maintain vertical positions at all times, and flexible driving connections between said units and said driven shafts, the pivoted connections of the units preventing lengthwise swaying thereof.

18. In a cotton picker, a tractor, a picking unit bodily supported at the side of the tractor forwardly of its rear wheels, and a hinged connection between the unit and the support permitting the unit to swing with respect to the tractor laterally of the line of movement thereof and at the same time constrain the same from lengthwise swaying.

19. In a cotton picker, a tractor, picking units laterally offset from, and horizontally alongside, said tractor and wholly within the lengthwise limits of the tractor, and supports projecting laterally from the tractor and hingedly connected directly to said picking units whereby the units are freely swingable laterally toward and away from the tractor to maintain vertical alinement at all times, and at the same time prevented from swaying lengthwise.

ALBERT C. FREUDENBERG.